United States Patent [19]

Glenn et al.

[11] Patent Number: 4,707,832
[45] Date of Patent: Nov. 17, 1987

[54] SWITCHED POINT-TO-POINT LOCAL AREA NETWORK CONTROL MECHANISM

[75] Inventors: Raymond R. Glenn, Round Rock, Tex.; Andrew T. Powshok, Indialantic, Fla.; Robert S. Padgett, Melbourne, Fla.; Pedro Uriarte, Indian Harbour Beach, Fla.; Joseph B. Cain, Indialantic, Fla.; Gautam H. Thaker, West Melbourne, Fla.

[73] Assignee: Harris Corporation, Melbourne, Fla.

[21] Appl. No.: 721,645

[22] Filed: Apr. 10, 1985

[51] Int. Cl.4 .......................... H04J 1/00; H04J 3/12
[52] U.S. Cl. ...................... 370/124; 370/85; 370/110.1
[58] Field of Search ............... 370/124, 76, 85, 110.1; 455/77; 375/7, 8

[56] References Cited

U.S. PATENT DOCUMENTS

| | | | |
|---|---|---|---|
| 4,339,816 | 7/1982 | Reed | 370/76 |
| 4,513,413 | 4/1985 | Gorman et al. | 370/124 |
| 4,519,074 | 5/1985 | Basile | 370/124 |
| 4,564,946 | 1/1986 | Yalata | 370/124 |
| 4,602,365 | 7/1986 | White et al. | 370/124 |

Primary Examiner—Robert L. Griffin
Assistant Examiner—Curtis A. Kuntz
Attorney, Agent, or Firm—Antonelli, Terry & Wands

[57] ABSTRACT

A local area network employs a shared control channel over which control messages between frequency agile modems for each of the user nodes of a distributed architecture-configured network are exchanged. In addition to the shared control channel, a plurality of data channel pairs is available for effecting full duplex communications between any two nodes of the network. Because all data channel assignments depend upon successful use of the control channel, a prescribed control channel contention access scheme is employed to optimize use of the control channel by all users of the network irrespective of the demand for its use. Pursuant to this scheme, each requesting node must first compare an accumulated activity measure with a traffic density threshold that is continuously optimized for the current level of control channel activity. Unless the accumulated measure is less than the threshold, the requesting user node is temporarily forbidden access to the control channel by a period of time designed to reduce traffic to the optimal level.

36 Claims, 14 Drawing Figures

FREQUENCY ALLOCATIONS OF CONTROL AND DATA CHANNELS

LOCAL LOOP BACK STATE

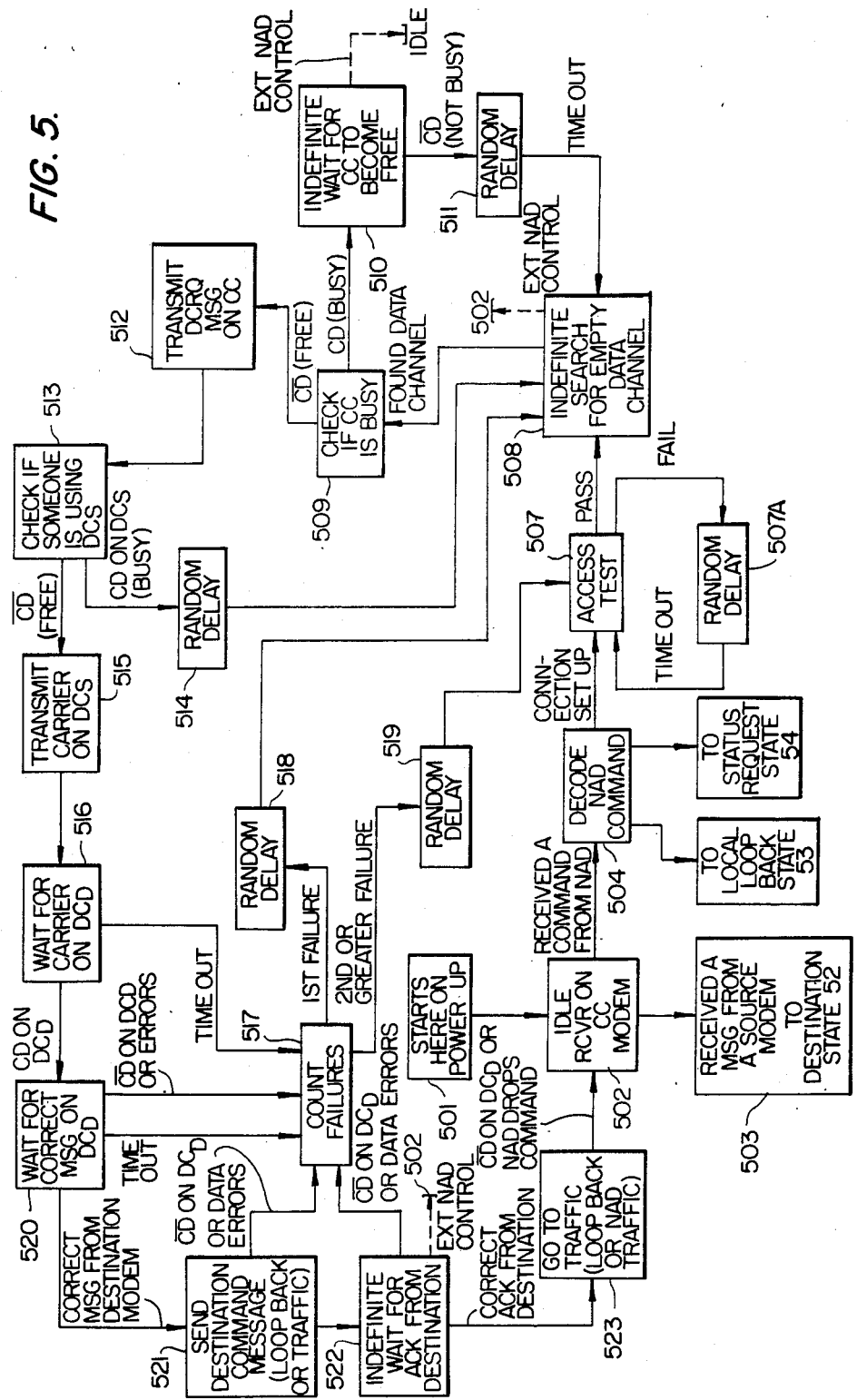

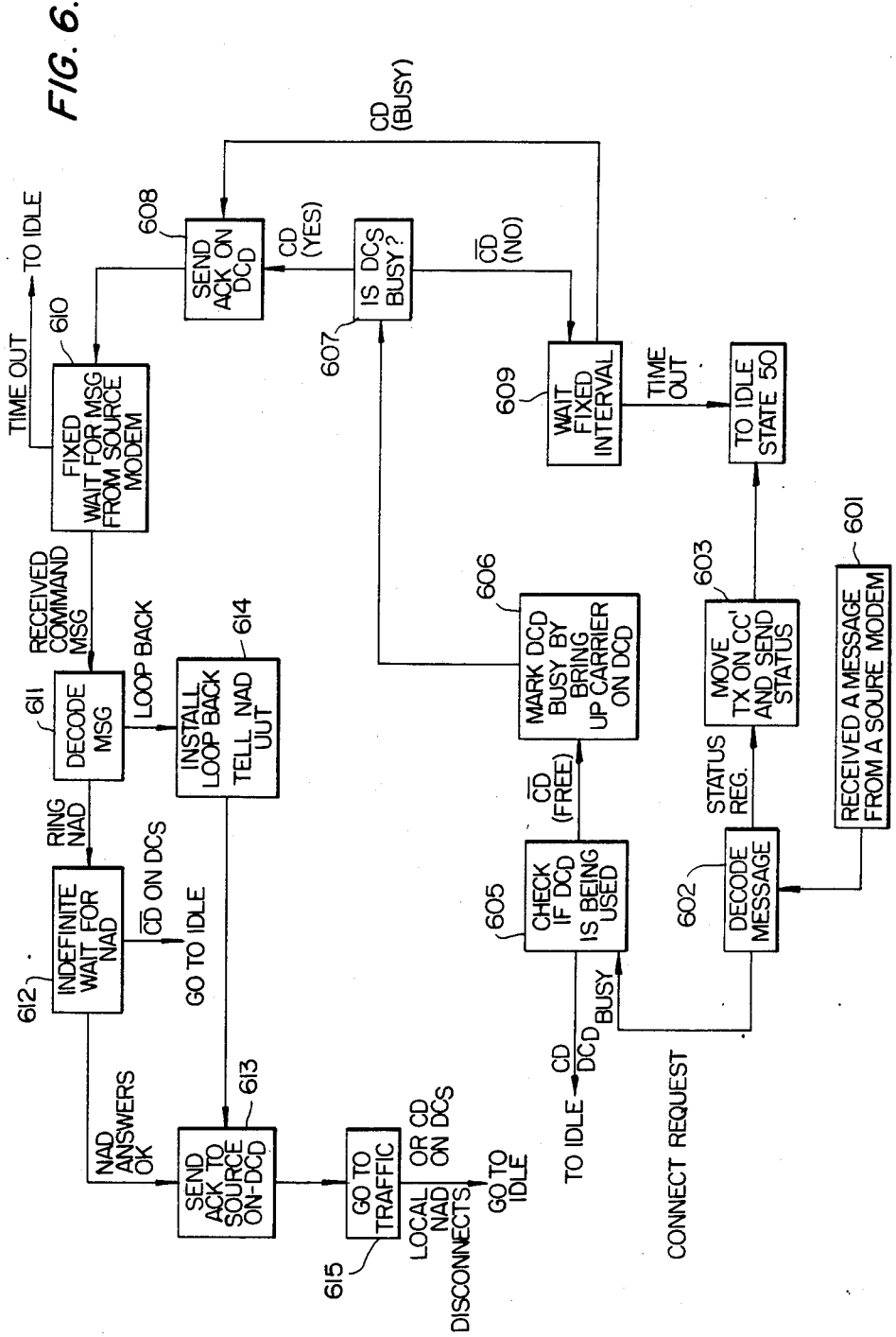

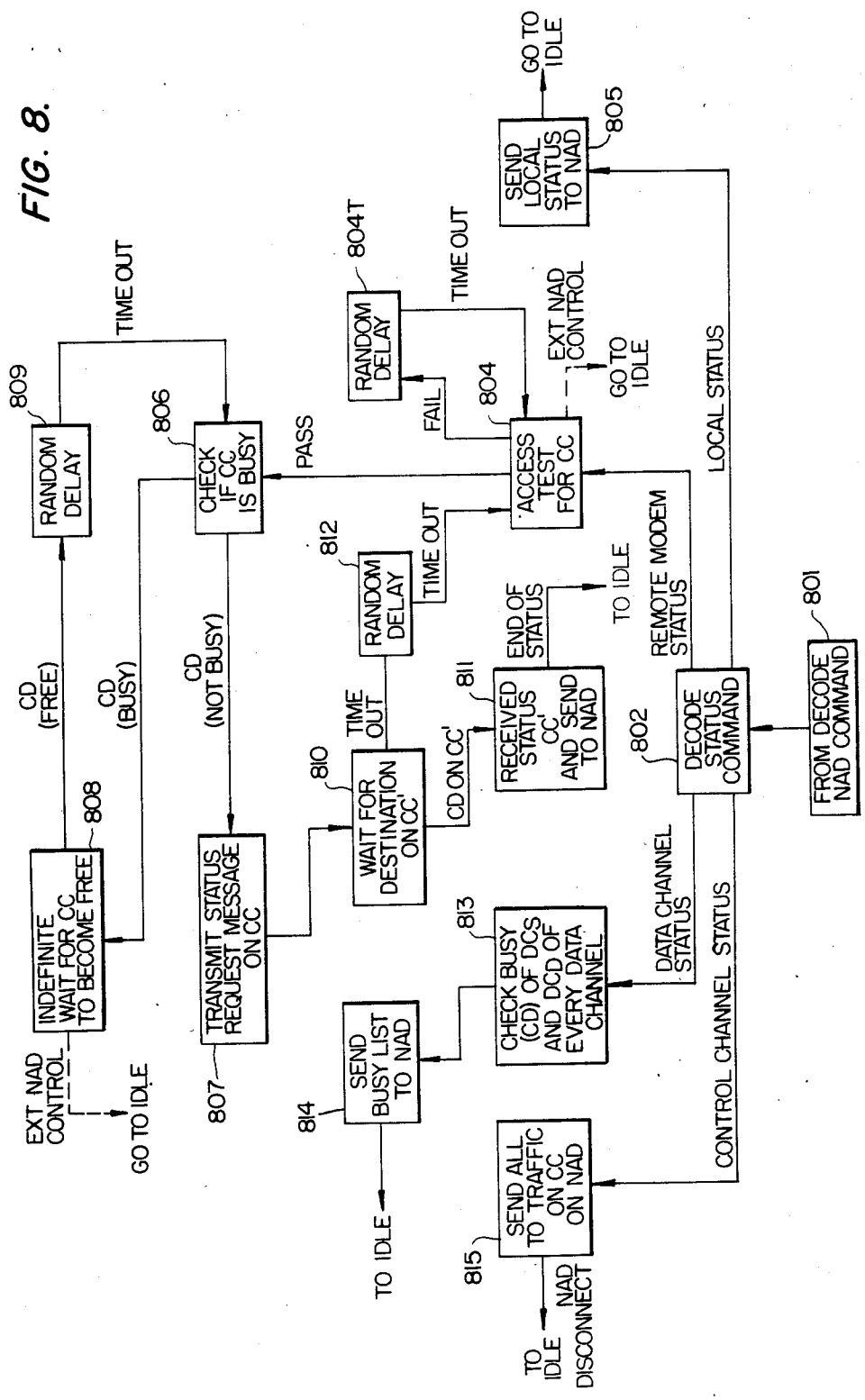

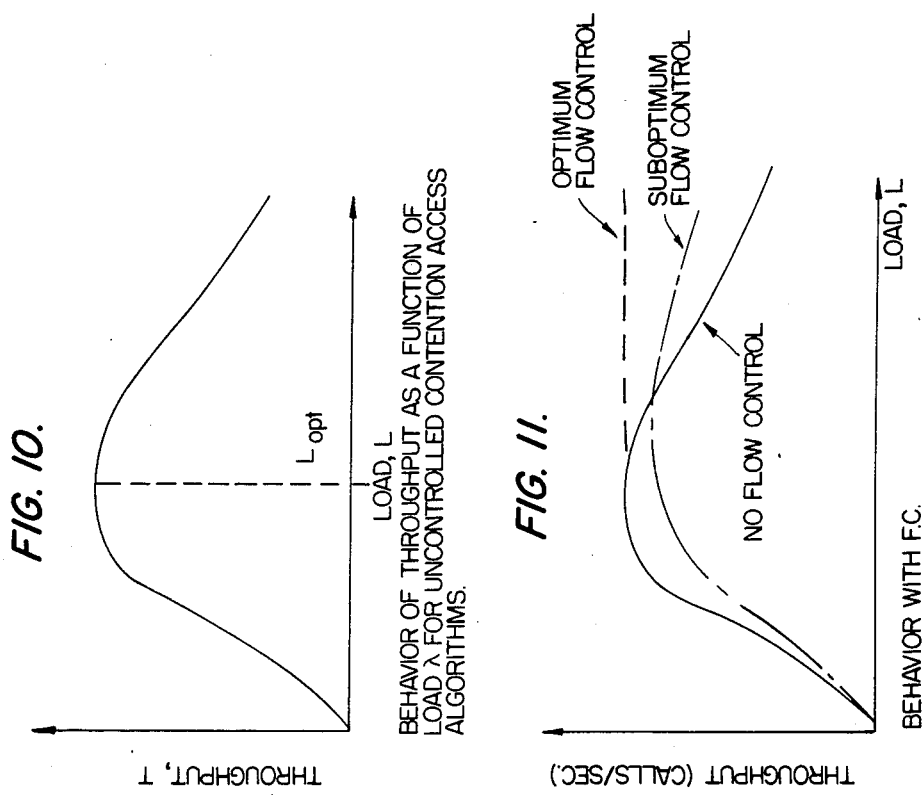

PROBABILITY FUNCTION USED FOR CHANNEL ACCESS TEST

SWITCHED POINT-TO-POINT LOCAL AREA NETWORK CONTROL MECHANISM

FIELD OF THE INVENTION

The present invention relates to communication systems and is particularly directed to a scheme for establishing full duplex communication channels among users of a distributed network without requiring the use of a centralized control facility.

BACKGROUND OF THE INVENTION

With the continued development and expansion of multi user data handling/processing systems, including their application to a variety of what in the past had been considered to be diverse user requirements, the performance of the communication network through which the users of the system exchange information has become a principal focus of design efforts. This is particularly true in the intra-office environment where the communication scheme chosen may be configured as a local area network, having a distributed architecture, permitting system components to be selectively added and replaced to meet the needs of the user.

Typically, control of access to the communication link through which all of the nodes of the network are coupled is carried out using either identical control and data channels (usually dedicated) and/or a centralized control facility (i.e. master station). Unfortunately each of these approaches introduces either additional system complexity and/or reduction in throughput performance to the extent that such schemes limit the adaptability of the network to a wide variety of user applications. For an exemplary illustration of a number of such communication channel allocation approaches attention may be directed to the following U.S. Pat. Nos. which exemplify the state of the art: 3,535,636; 3,261,922; 3,573,379; 4,409,687; 3,590,166; 4,127,744; 3,898,390; 4,284,848; 4,012,597; 3,513,264; 4,013,840; 4,262,171; 2,584,259; 4,339,816; 3,808,537; 3,809,816; 4,360,927; and 3,617,644.

For the most part this patent literature describes systems that employ a control or master station that handles the establishment of all communication channels among users (as commonly employed in mobile radio communication systems as detailed in U.S. Pat. Nos. 3,989,390; 4,127,744 and 3,590,166), or use dedicated channel assignments for the respective stations (e.g. a station's identity is a particular frequency).

SUMMARY OF THE INVENTION

Rather than employ a master or control station through which connectivity between any two users is established, or use frequencies that are dedicated to the respective stations of the system, the present invention provides significantly improved versatility over conventional schemes, such as those referenced above, through the use of a common or shared control channel and frequency agile modems for each of the user nodes of a distributed architecture-configured network. In addition to the shared control channel to which all users are normally tuned, the network according to the present invention uses a plurality of data channel pairs each of which is available for effecting full duplex communications between any two nodes of the network.

When one user node (calling station) wishes to communicate with an other user node (called station), it examines the spectrum of data channel pairs for availability. Upon locating an available data channel pair, the calling station tunes its frequency agile modem to the control channel, and transmits a message over the control channel to the called station telling the called station to tune its own frequency agile modem to the located data channel pair. Both calling and called stations then once more check the previously located data channel pair for availability. If the data channel pair is still available, data exchanges between calling and called stations on the data channel may commence. If, however, the previously located data channel pair is no longer available, the call is aborted and the calling station goes back to the process of searching for an available data channel pair while the called station tunes its frequency agile modem to the control channel.

Because all data channel assignments depend upon successful use of the control channel, a prescribed control channel contention access scheme is employed to optimize use of the control channel by all users of the network irrespective of the demand for its use. Pursuant to this scheme, each user of the network periodically monitors (samples) the control channel for activity (presence of carrier) and accumulates a measure of that activity over a continuously sliding (forward in time with each sample) window. The larger the accumulated measure, the larger density of access (congestion) and the higher the probability that a user node's control message would collide with that of another node.

Rather than permit each node to access the control channel at will, each requesting node must first use its accumulated activity measure to look up the probability that it can access the channel. This probability is thus continuously optimized for the current level of control channel activity. It determines a threshold which is compared with a random number. Unless the random number is less than the threshold, the requesting user node is temporarily forbidden access to the control channel by a period of time designed to reduce traffic to the optimal level. At the end of this delay period, the access-requesting user node once again conducts the "access test" (threshold comparison). This process is repeated until the threshold comparison test is passed, indicating that, based upon the optimal probability reference, a transmission from the calling station to the called station over the control channel should have a near-optical probability of success.

Unlike a number of conventional collision avoidance mechanisms, the access contention scheme of the present invention is priority-less; it is designed to optimize throughput over the control channel regardless of which user is requesting access. This greatly simplifies user station hardware and system complexity. Also, because the optimum level of throughput is adjusted for traffic density on a continuous basis, the access control mechanism of the present invention will exhibit a faster recovery from an overload condition than conventional approaches.

BRIEF DESCRIPTION OF THE DRAWINGS

FIG. 5 is an operational flow diagram for the source state of a modem;

FIG. 6 is an operational flow diagram for the destination state of a modem;

FIG. 8 is an operational flow diagram of the status state of a modem;

FIG. 10 is a graph showing the behavior of throughput T as a function of load L for uncontrolled contention access of a shared communication link;

FIG. 11 is a graph showing the behavior of throughput T as a function of load for both controlled and uncontrolled contention access of a shared communication link;

FIG. 12 is a graph showing the behavior of throughput T as a function of channel utilization with no flow control;

DETAILED DESCRIPTION

Figure 1:
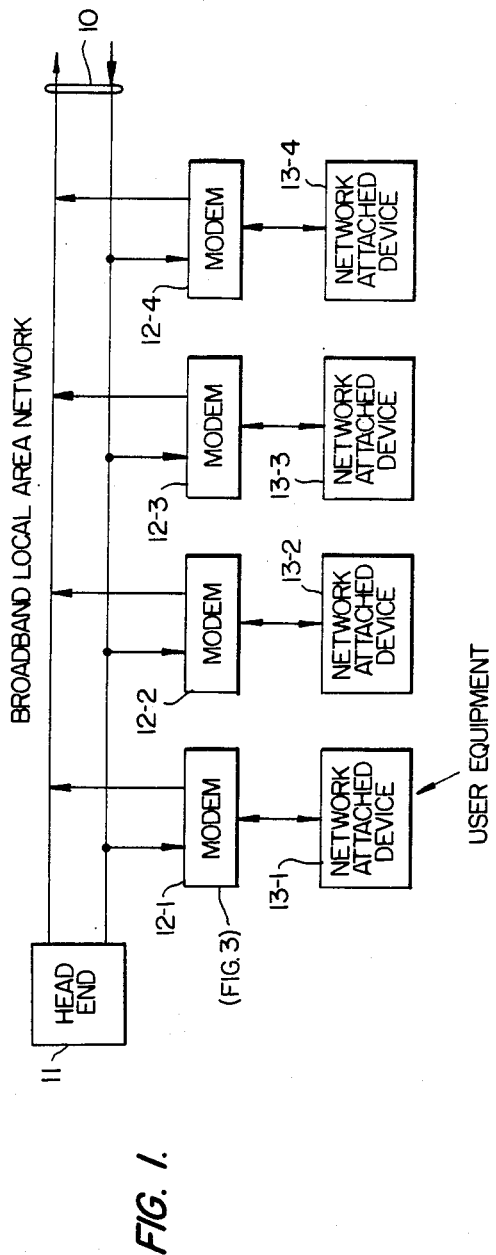
FIG. 1 is a block diagram of a distributed switched point-to-point local area network.

Before describing, in detail, the particular improved switched point-to-point local area network distributed communication scheme in accordance with the present invention, it should be observed that the present invention resides primarily in a novel structural combination of conventional data processing components and communication circuits, and not in the particular detailed configurations thereof. Accordingly, the structure, control, and arrangement of these conventional components and circuits have, for the most part, been illustrated in the drawings by readily understandable block representations and schematic diagrams, which show only those specific details that are pertinent to the present invention, in order not to obscure the disclosure with structural details which will be readily apparent to those skilled in the art having the benefit of the description herein. In addition, various portions of an electronic data processing system have been appropriately consolidated and simplified in order to emphasize those portions that are most pertinent to the present invention. Thus, the block diagram illustrations of the Figures do not necessarily represent the mechanical structural arrangement of the exemplary system, but are primarily intended to illustrate the major structural components of the system in a convenient functional grouping, whereby the present invention can be more readily understood.

Figure 3:
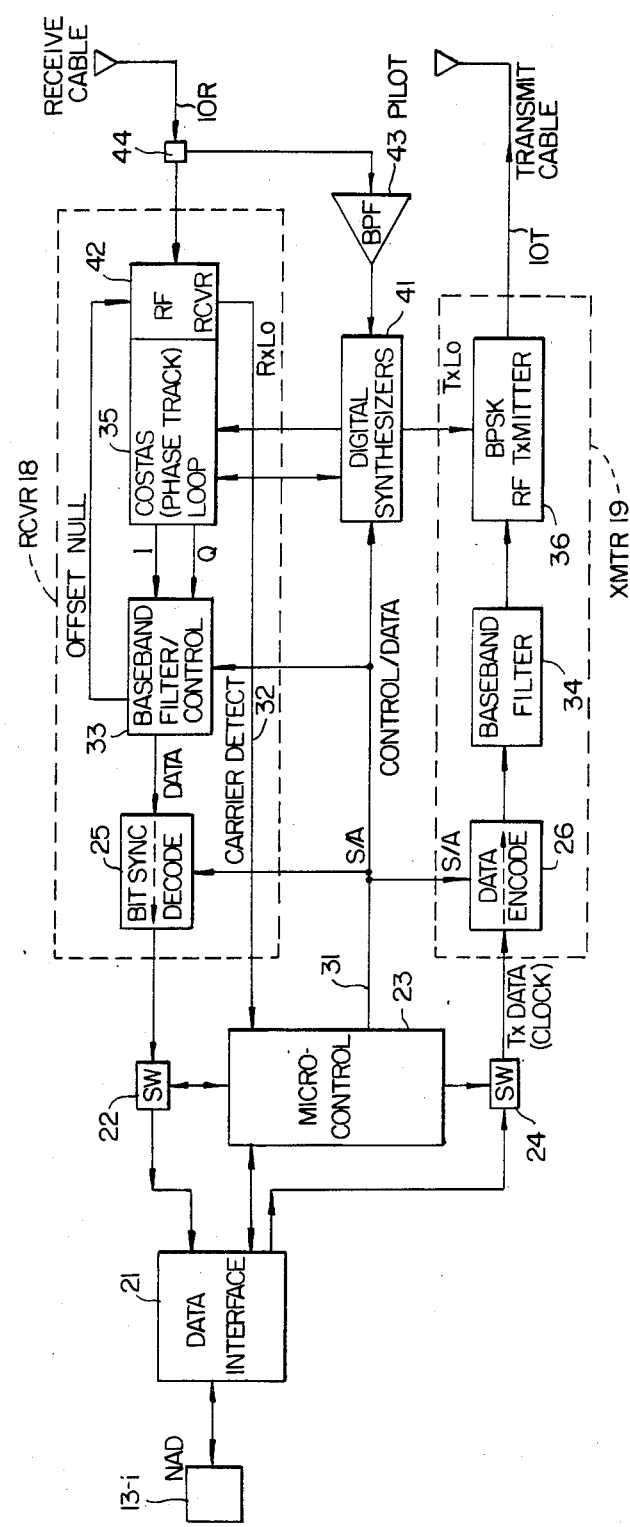
FIG. 3 is a block diagram of a modem employed in a respective node of the local area network of FIG. 1.

Referring to FIG. 1, there is shown a block diagram of a distributed switched point-to-point local area network. For purposes of the present description, the actual medium of which the communication link is configured may comprise a dual CATV cable which is coupled to a head end 11 and extends in an eastward direction from head end 11. By head end is meant a passive path where an RF carrier that is conveyed over a transmission portion of the CATV cable is coupled or looped back to a receive portion of the CATV cable. At the head end a summing junction is provided for the insertion of a pilot tone (e.g. on the order of 45 MHz) in order to provide a frequency reference for all transmit and receive oscillators in the system. As will be described in detail below these oscillators are in the form of a controlled frequency synthesizer contained within each of the modems that are distributed along the communication link. Distributed along link 10 are a plurality of modems 12-1, 12-2, 12-3, 12-4 ... (the detailed configuration a respective one of which is shown in FIG. 3 to be described below) which are coupled to associated user equipment, identified as network attached devices (NADs) 13-1, 13-2, 13-2, 13-4, ..., such as data/word processing terminals, facsimile apparatus, voice terminals, etc. each having suitable encoding/decoding equipment for assembling/recovering serialized digital bit streams conveyed over link 10. For purposes of the present description an understanding of the details of the NADs themselves is unnecessary and will not be presented here. Instead, the explanation will focus upon the communication scheme employed in the distributed network architecture.

As mentioned previously, one of the principal features of the present invention is the use of frequency agile transceiver equipment (modems) at each of the user modes, which are used for both control and data channel communications. It is the frequency agility of the modems and the tuning of respective pairs of user modems to the control channel and an available data channel pair that provides the switched point-to-point data exchange capability of the invention.

Figure 2:
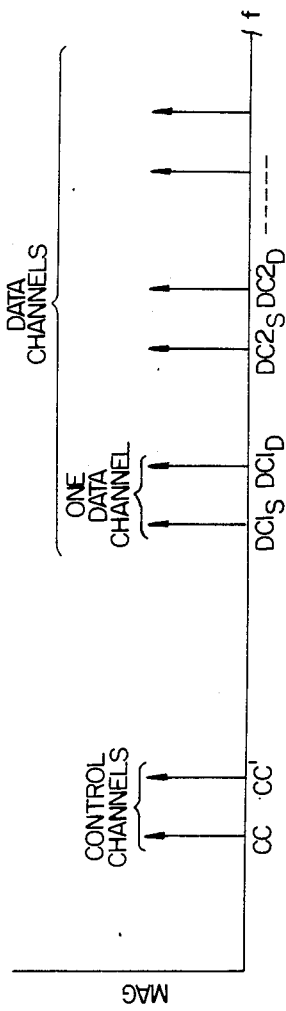
FIG. 2 is a diagram of frequency allocation among control and data channels of the network of FIG. 1.

The allocation of frequency channels for control and data communications is diagrammatically illustrated in FIG. 2, which shows a principal control channel CC and an auxiliary control channel CC' occupying a first portion of assigned bandwidth and a plurality of data channel pairs $DC1_S$, $DC1_D$; $DC2_S$; $DC2_D$; ... occupying an adjacent segment of bandwidth. For the most part auxiliary control channel CC' is not employed for control communication purposes, but is paired as a backup or adjunct to principal control channel CC. Also, it is to this auxiliary channel CC' that the transmitter frequency is an idle modem is tuned (but substantially attenuated). For purposes of providing a practical example of spectrum parameters within which the present invention may operate it will be assumed that the network operates at a data rate up to 64 Kbps over a (carrier) frequency range of 40–300MHz, binary psk modulation.

Referring now to FIG. 3, the configuration of an individual frequency agile modem is shown as including a receiver section 18 and a transmitter section 19, each under the control of a microprocessor controller 23. The modem itself interfaces with an associated NAD through a data interface 21. Respective switches 22 and 24, under control of the microcontroller 23, are provided to selectively couple the transmitter and receiver sections through the data interface to the NAD. For this purpose, microcontroller 23 includes a microprocessor, associated memory and local buffer circuitry for interfacing with the respective components of the receiver and transmitter sections of the modem and through data interface circuit 21 to the NAD for controlling the operation of the modem. Further details of the frequency agile modem are disclosed in U.S. patent application Ser. No. 721,747, filed on even date herewith, entitled "Frequency-Agile Synchronous Demodulator", and assigned to the Assignee of the present application. The discussion to follow will focus upon the operational sequence carried out by microcontroller 23 in the course of its control of the transmitter and receiver sections of the modem.

For signal/carrier processing, the transmitter section 19 of the modem includes a data/encoder unit 26 which is coupled to a control/data link 31 from the microcontroller, which link is also interfaced with other components of the modem, as will be described below, for controlling the operation of various system components. Data/encoder 26 also receives digital data to be transmitted that is supplied from the data interface circuit 21 through switch 24, including any associated clock signals (in the course of synchronous data transmissions). Normally, switch 24 interrupts the data path from the data interface 21 to the data/encoder circuit 26 until a call has been set up. Once the call has been established and a command has been supplied from the local NAD to the microcontroller, the microcontroller will enable switch 24 to couple digital data from the local NAD through the interface to the encoder 26. The output of encoder 26 is coupled through a baseband filter 34 to a transmitter 36. Filter 34 operates to convert digital square waves to sine waves, while still retaining the zero-crossing information of the square waves, in order to reduce the bandwidth needed by the bit to be transmitted. The filtered data is coupled to a transmitter 36 (here bpsk or some other form of carrier modulation which maintains carrier). The local oscillator signal for the transmitter 36 is supplied from a digitally controlled synthesizer 41 under the control of microcontroller 23 on link 31. As mentioned previously, in the course of the setting up of a call, a modem locates a pair of available data channels (one for transmit and one for receive). In carrying out this assignment of channels, microcontroller 23 tunes the transmit local oscillator portion of the digital synthesizer unit 41 to the source frequency of the dual channel pair located. The output of transmitter 36 is coupled to the transmit portion 10T of the network transmission cable 10.

The receiver section 18 includes a receiver 42 the input of which is coupled through a splitter 44 to the receive portion 10R of the network cable 10. Splitter 44 is also coupled through a bandpass filter 43 which is tuned to the pilot frequency of the system (e.g. 44.5 MHz). The output of filter 43 is coupled to digital synthesizer unit 41.

The down conversion receiver 42 includes a phase tracking loop 35 (such as a Costas loop) which is controlled by the receiver local oscillator signal generated by the digitally controlled synthesizer unit 41 under the control of the microcontroller 23. The output of phase tracking loop 35 includes a pair of in-phase (I) and quadrature (Q) channel signals, the in-phase (I) signal corresponding to the data. The receiver also supplies a carrier detect signal to the microcontroller over link 32. The output of the phase tracking loop is filtered in a controlled baseband filter 33 (under the control of microcontroller 23) and the recovered data is fed to a bit sync/decoder unit 25. The controlled baseband filter 33 also provides an offset null signal to the receiver 42 for nulling off sets in the received signal. This nulling scheme is disclosed in U.S. patent application Ser. No. 721,824, filed on even date herewith, entitled "Apparatus and Method for Removing an Offset Voltage", now U.S. Pat. No. 4,575,683 issued Mar. 11, 1986 and assigned to the Assignee of the present application. Bit sync/decoder 25 removes any clock signal if the data is synchronous and supplies the output data to switch 22. Switch 22 normally interrupts the flow path to the data interface until the call has been established, the initial call set up signalling being monitored by the microcontroller 23. Once the call has been set up, micro controller 23 controls switch 22 to couple the incoming data to the data interface for application to the NAD. In one embodiment of the present invention the switched point-to-point local area network includes an equalization scheme for limiting the wide dynamic range of signals carried by the link 10. Such an equalization scheme is disclosed in U.S. patent application Ser. No. 721,794, filed on even date herewith, and assigned to the Assignee of the present application.

The operation of the modem, under control of microcontroller 23 in response to command signals from the associated NAD or from a remote user, will be described below with reference to functional sequence diagrams associated with four operational states of the modem. These states are illustrated in the state diagram of FIG. 4 as a source state 51, a destination state 52, a loop back state 53 and a status state 54, each of which references the idle state 50 of the modem. The source state 51 is entered by the modem when the local NAD desires to set up a connection with a remote user. Namely, from the idle state 50, a command from the associated local NAD (i.e. one directly connected to the modem) causes the modem to source a message to a remote user 50 (i.e. at another part of the system). Once the conversation between the local NAD and the remote user has been completed, the modem changes state from the source state 51 back to the idle state 50.

The destination state 52 is entered by a local NAD when a remote user is trying to set up a connection with a local NAD. Namely, in response to a call from a remote (source) modem, the local modem enters the destination state 52 from the idle state 50. Once it has completed its conversation with the remote modem or conducts a status test (as will be explained below) it returns to the idle state 50.

The local loop back state 53 is entered into when the local NAD causes the modem to loop back all traffic received from that NAD. The loop back state 53 is accessed from the idle state 50 and returns to the idle state 50 in response to command from the local NAD. The purpose of the loop back state is to facilitate diagnostic testing of the modem. Loop back is used to test the data paths of the modem.

Finally, the status state 54 is used to gather status on either another node, itself or the network, in response to a command from the local NAD. Status is employed for diagnostic testing—to test control portions of the modem. This status state 54 is entered from the idle state 50 in response to a command from the local NAD and returns to the idle state once the status check has been completed.

Figure 4:
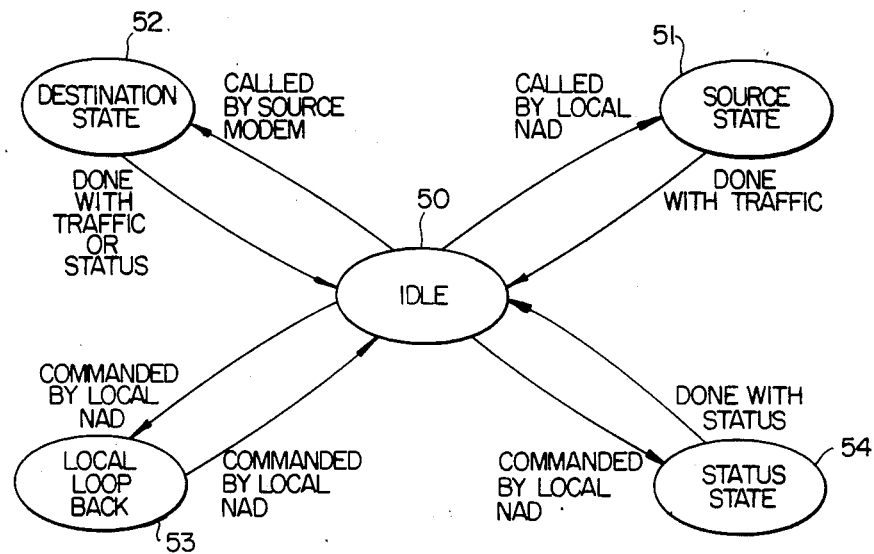
FIG. 4 is a state diagram of a respective modem of the network of FIG. 1.
Figure 9:
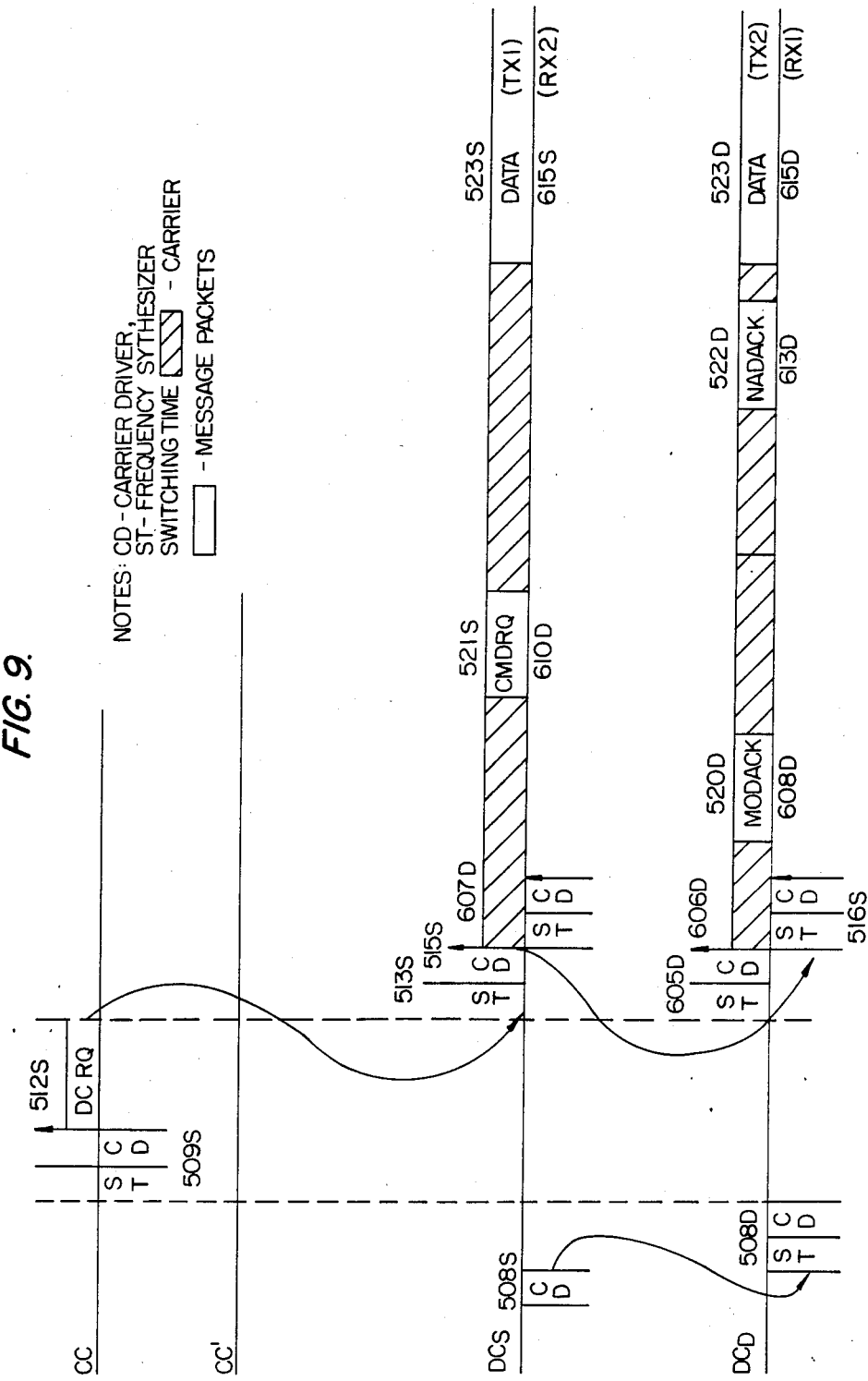
FIG. 9 is a timing diagram of the connection sequence of the source and destination status of a modem.

Each of the above states will be described in detail below with reference to FIGS. 5–9, FIGS. 5–8 corresponding to operational flow diagrams for the modem for the respective source state 51, destination state 52, local loop back state 53 and status state 54 shown in FIG. 4. FIG. 9 shows the connection sequence on the control channel and the source and destination data channels carried out by the modem.

SOURCE STATE 51

Unless the modem has been commanded by its associated NAD to perform a specific function, namely to enter one of the states 51-54, it is in the idle state 50. This is reflected in the flow diagram of FIG. 5 wherein, on power-up 501 the modem enters the idle mode 502, with microcontroller 23 adjusting the local oscillator in the synthesizer 41 to cause the frequency agile receiver 42 to be tuned to the frequency of the control channel CC. In this state, the modem is monitoring the receive section 10R of the local area network cable 10 for the possibility of a call being addressed to it from a remote modem. Since, in the present state, it is assumed that no messages are being directed to the local modem, but rather the modem is to be used to source a message to another unit, the modem will respond to a command from a NAD at 504 to set up a connection. Had the modem been destined for a message from another NAD, the modem would have entered the destination state 52 from the idle state 50. Since the command from the NAD is to source a message to another modem, the modem will progress to the access test 507 rather than to a local loop back state 53 or status request state 54.

The command from the NAD is coupled through data interface 21 to the microcontroller 23. In response to this command, the microcontroller performs a traffic contention or access test 507 to be described in greater detail below in conjunction with the description of FIGS. 10-14. The access test is used to dynamically control traffic on the control channel in a distributed manner to prevent overload conditions. For purposes of the present description, it will be assumed that the source modem has passed the access test 507 and is to proceed to search for available data channels in step 508.

The search for available data channels is carried out by successively tuning the frequency agile receiver to the available data channel frequencies within the data channel band until a pair of data channels have been located. For this purpose, microcontroller 23 supplies, as necessary, successive digital codes over link 31 to digital frequency synthesizer 41. The search typically begins at one end of the frequency spectrum and proceeds across the data channel band shown in FIG. 2. Once a pair of frequencies is found the scan stops. When the scan resumes, it picks up the search where it left off during the previous search. As microcontroller 23 instructs synthesizer 41 to tune receiver 42 to the frequency of data channel $DC1_S$, the receiver then monitors the network cable 10 for the presence of carrier at the frequency $DC1_S$. If no carrier is detected at that frequency, the state of the carrier detect link 32 remains low and microcontroller 23 then identifies that source frequency $DC1_S$ and its associated destination frequency $DC1_D$ as available for carrying out a message exchange between the source modem and the remote modem with whom the call is to be set up. This carrier detect step for source frequency $DC1_S$ is shown in the step flow diagram of FIG. 9 at 508-S. Microcontroller 23 then tunes frequency synthesizer 41 to the destination channel frequency $DC1_D$, as shown at 508-D of FIG. 9. Having found these frequencies to be available, so that a full duplex communication channel is available for a data exchange conversation, microcontroller 23 then sends a code over link 31 to tune the synthesizer 41 to the frequency of the control channel CC corresponding to step 509 in FIG. 5. The flow sequence is identified at 509-S in FIG. 9 whereat the modem checks the control channel CC for the presence of carrier. If carrier is present on the control channel, indicating that another modem is currently using the control channel, the microcontroller enters a wait period including a prescribed random delay at steps 510-511 (FIG. 5). Once carrier is no longer detected on the control channel, the modem returns to step 508 and begins again its search for a pair of available source and destination channels. Should it be desired to exit from the search for an available data channel pair (step 508) or for the control channel CC to become free (step 510), a return to idle mode (step 502) may be provided by a command within the NAD external to the modem, as represented by the broken lines from steps 508 and 510. Here, it assumed that the control channel is free so that it is available for transmitting a request message packet to the destination NAD over the control channel. This is indicated in step 512 of FIG. 5 and shown as a data channel request message on the control channel at 512-S in FIG. 9. This message packet contains information identifying the address of the destination module and contains a command for the destination module to tune its modem to the identified data channels $DC1_S$ and $DC1_D$.

Before the source modem initiates a conversation with the destination modem over the previously located source and destination channels, it once again checks to see if the source data channel $DC1_S$ is still available. This step is carried out to cover the interim time period between the original location of a free channel and the sending of the call request packet over the control channel to the destination modem. If, in step 513, the source modem detects that the previously detected-to-be-free source channel is busy, then, subsequent to a time out delay in step 514, the source modem returns to the step 508 of searching for available data channels. Assuming that the data channel is still free, then the source modem proceeds to tune the transmitter 36 to the previously located available source frequency $DC1_S$ and transmit that carrier over the transmit portion 10T of the transmit cable 10, corresponding to step 515 in FIG. 5 (and indicated at 515-S in FIG. 9).

At the same time that the source modem is transmitting the source carrier, it monitors the receive cable portion 10R for the presence of the destination carrier to which the destination modem should have now tuned its transmitter and be transmitting the destination carrier $DC1_D$ over the received cable link 10R, as indicated by step 516 in FIG. 5 and represented at destination carrier monitor 516-S in FIG. 9.

In the course of monitoring the destination data channel $DC1_D$, the source modem looks for an acknowledgement message from the destination modem. When this message is received, as shown at step 520 in FIG. 5 and identified as 520-D in FIG. 9, the source modem then sends a command message (here that a data exchange communication is to commence) at step 521, identified at 521-S on the source data channel $DC1_S$, in FIG. 9. The source modem then monitors the destination channel $DC_D$ for an acknowledgement of the command message at step 522 in FIG. 5 and at 522-D in FIG. 9. Once the acknowledgement message from the destination modem has been received, all preliminaries for setting up the call have been completed and both modems now commence the transmission of data, at step 523-S in FIG. 9 for the source modem, and 523-D for the destination modem. Again, as with the case of steps 508 and 510, an exit from the indefinite wait of step 522 may be effected by a NAD command external of the modem, as represented by the broken lines from step 522 back to idle (step 502).

Should there be a failure of any of the monitoring and transmission steps 516-522, the flow proceeds to step 517 whereat failures in acknowledgement or retransmission are counted and a time out is employed, either at step 518 for an initial failure or at step 519 for subsequent failures and the process returned to an appropriate level of the flow. For the first failure, through a time out at 518, the process returns to searching for an available pair of data channels. For a more significant failure, the process returns to an initial reexamination of the control channel for availability through the access test 507.

DESTINATION STATE

Operational flow for the modem for whom the message is destined from a source modem, namely a modem to be placed in the destination state, is shown in FIG. 6. With attention again directed to FIG. 9 (as well as FIG. 6) as pointed out above, when not participating in a call each modem normally monitors the control channel CC for control messages that may be directed to it. When a destination connect request is detected on the control channel, as indicated at step 601 in FIG. 6 (and at 512-S in FIG. 9), the destination modem decodes the message at step 602. If the message is a status request, the destination modem sends its status at step 603 and then returns to the idle state 50. Here, however, it is assumed that the destination modem is one which is to exchange data with a calling source modem. When the destination modem decodes the request message, it checks to see whether the destination channel assigned by the connection request from the source modem is available, it being recalled that between the time that the source modem first detected availability and the time that the destination modem receives a connection request on the control channel, the channel that was originally located could have become occupied. If the destination data channel is detected as being busy, the destination module returns to the idle state 50 and continues to monitor the control channel CC for new instructions. If step 605 indicates that the data channel is available, the destination modem turns on the destination data channel carrier $DC1_D$ at step 606, identified as carrier turn on 606-D on the data channel $DC1_D$ in FIG. 9 and, simultaneously, monitors the source data channel $DC1_S$ at step 607 for the presence of carrier from the source modem, as identified at 607-1 in FIG. 9. If the destination modem fails to detect the presence of carrier $DC1_S$ on the source data channel, it is assumed that there has been a failure from the source modem and the destination modem waits a prescribed interval at step 609 before timing out and returning to the idle state 50. Otherwise, as shown here, the destination modem detects the presence of carrier at step 607 and sends an acknowledgement message at step 608, identified at 608-D in FIG. 9.

The destination modem then monitors the source data channel $DC1_S$ at step 610 for the presence of a command request identified at 610-D (corresponding to command request 521-S for the source modem in FIG. 9). If the command request is not received, the destination modem returns to the idle state from step 510. If the command request is received at step 610, the message is decoded in step 611. Assuming that the message does not relate to a loop back (which would cause the modem to shift to step 614 to install loop back and acknowledge the loop back to the local NAD), the destination modem waits for acknowledgement from the associated NAD (step 612) and then sends an acknowledgement message at step 613 on the destination data channel $DC1_D$ back to the source modem at step 613 (identified as NAD ACK at 613-D in FIG. 9). The destination modem then proceeds to send data at step 615 (corresponding to data transmission at 615-D and receipt of data from the source modem at 615-S in FIG. 9). Once there has been a completion of exchange of data or the local NAD disconnects, the destination modem returns to the idle state 50. While waiting for acknowledgement from the associated NAD in step 612, should there be loss of carrier on the source data channel, then the flow returns to idle as shown by idle return line ($\overline{CD}$ or $DC_s$)

LOCAL LOOP BACK

Figure 7:
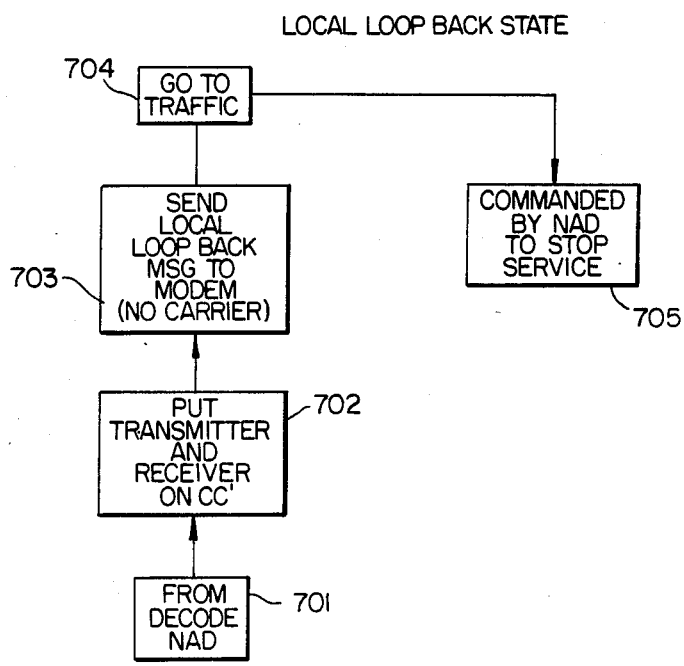
FIG. 7 is an operational flow diagram of the local loop back state of a modem.

The flow for local loop back is illustrated in FIG. 7. As discussed above in conjunction with the flow of FIG. 5 for a source modem, normally each modem is in the idle state monitoring the control channel CC. Where a command is received from a local or remote NAD for conducting a loop back test at step 701, both the transmitter and receiver local oscillator frequencies are set to an auxiliary control channel CC'. The NAD then sends a local loop back message to the modem at step 703 and data is exchanged between the two at step 704. Once the loop back test has been completed, the modem returns to its idle state 50 at step 705.

STATUS

The flow for the status state is illustrated in FIG. 8 as starting with a decode of a command from a NAD at step 801 and decoding the status command at step 802 (corresponding to step 504 in FIG. 5 to the status request state at step 506). The status command will designate one of the local status, remote modem status, data channel status or control channel status. For local status, in response to the command from the NAD, the modem sends its status to the NAD at step 803 and returns to idle. For a control channel status, all of the traffic being received in the receiver from the control channel is coupled at step 815 directly through switch 22 and the data interface 21 to the NAD.

For supplying an indication of data channel status, the modem monitors the status of every available data channel in the spectrum of data channels (as shown in FIG. 2) and marks all of those which are busy. It then encodes a message and sends that message through the data interface 21 to the NAD at step 814, so as to effectively send a list of the traffic density of the data channels to the NAD. Once this list is sent, the modem returns to the idle state 50.

For monitoring the status of a remote modem, the modem must first determine whether or not the control channel CC is available. An access test corresponding to access test 507 in FIG. 5 is conducted at step 804. If the control channel is not available (test failed), the modem waits for a random delay (time-out) interval (step 804T) and then returns to step 804. If this test is passed, the local oscillator in the modem is tuned to the frequency of control channel CC. If no carrier is detected at frequency CC, the modem transmits a status request message over to the destination modem at step 807, then waits for a reply message on the other carrier channel CC' from the destination modem at step 810. Namely, the destination modem is instructed to tune its transmitter to the auxiliary control channel CC' and transmit that carrier. The local modem then tunes its receiver to the control channel CC' and, upon detecting the presence of carrier CC' at step 811, sends an indication of the operation of both control channels CC and CC' to the NAD and returns to idle at 50.

If the remote modem fails to turn on the auxiliary control channel CC', then, after a prescribed delay time at step 812, the modem returns to the access test at step 804 and again proceeds to conduct the remote modem status check.

If, in the process of attempting to conduct the test, control channel CC is not available, there is a time out through step 809 before returning to step 806 and again checking the availability of the control channel. This step is conducted so that the modem may transmit its message over the control channel CC to the remote modem and request that the remote modem turn on auxiliary control carrier CC'. As with the indefinite search/wait routines of step 508 and 510 of FIG. 5, a return to idle state may be provided by an external NAD command as shown by the broken exit lines to idle for steps 804 and 808 in FIG. 8.

ACCESS CONTENTION

As described above in conjunction with the flow diagrams of FIGS. 5 and 8, when a NAD desires to set up a communication, it does not automatically have access to the control channel CC since the control channel is employed in common or is shared by all of the users of the network and some mechanism must be provided to prevent collisions on the control channel CC among the various users of the network. This collision avoidance or access contention scheme is conducted as a test prior to gaining access to the control channel.

Typically, conventional contention access schemes (as described in the literature under the names Aloha, Slotted Aloha, CSMA and CSMA/CD) exhibit similar behavior when defining channel throughput T (error-free packets/second) as a function of the offered load L. More particularly, as illustrated in FIG. 10, there is some load $L_{opt}$ at which channel throughput is optimized. Beyond this load factor $L_{opt}$, the throughput T is severely degraded because the collision probability increases rapidly. This, in turn, reduces the number of error-free packets/second capable of being transmitted, even though the channel is heavily utilized.

A primary objective of the access contention scheme carried out in accordance with the present invention is to prevent loads significantly larger than $L_{opt}$ from occurring on the network. An optimum flow control scheme ideally has the behavior depicted in FIG. 11 which shows, in addition to the characteristic of FIG. 10, (no flow control), an optimum flow control characteristic (dashed lines) and a suboptimum flow control characteristic (dot-dashed lines). Ideally, the mechanism employed should be such that the load L seen on the multi-access channel is limited to $L_{opt}$ when L is greater than $L_{opt}$. In this manner, an optimum value of throughput is maintained whenever $L > L_{opt}$.

In accordance with the present invention, channel utilization p (the fraction of the time the channel is in use) is monitored as a direct indication of the channel state. For a channel having no flow control, the throughput T varies as a function of channel utilization in the manner shown in FIG. 12. As can be seen from FIG. 12, there is some optimum value $p_{opt}$ of channel utilization which maximizes throughput T. By measuring channel utilization p over some time interval and regulating the input message flow or access to the channel, so as to maintain this channel utilization near the region $p_o$, flow control can be easily managed.

In accordance with the present invention, a random delay time factor is employed to control entry onto the control channel. Moreover, the delay time is selected based upon a measurement of channel utilization p which can be used to control the flow to a nearly optimum level.

Figure 13:
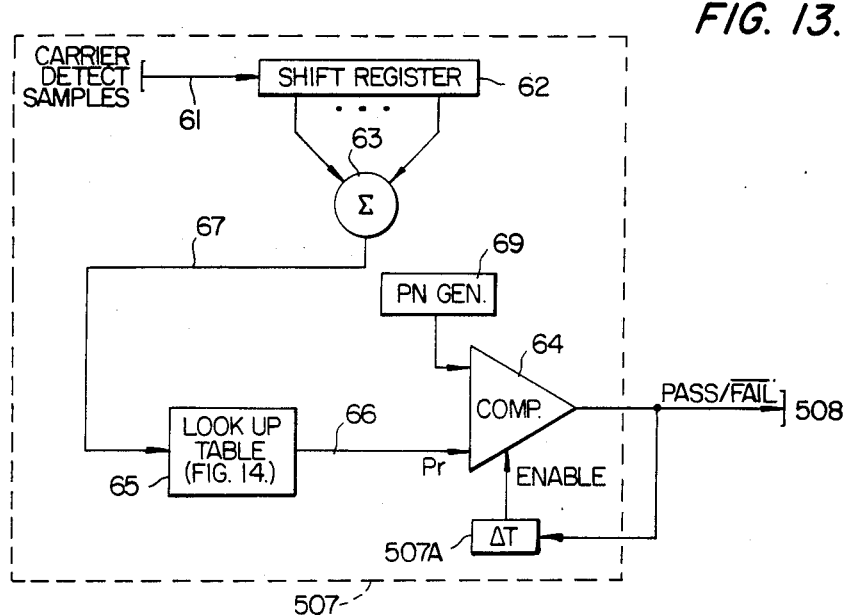
FIG. 13 is a functional block diagram of a contention access scheme employed in accordance with the present invention.

In accordance with the access test (507 in FIG. 5 and 804 in FIG. 8) the carrier detect signal supplied from the receiver equipment in the modem is sampled once per transmission packet and its value is coupled to a shift register having a length or window corresponding to some number of samples. This is illustrated in FIG. 13 wherein successive carrier detect samples from the control channel on link 61 are shifted into a shift register 62 of some number N of samples in length. As each new sample is shifted into the front end of shift register 62, the last sample is dumped out the rear end and discarded. As a result, the most recent N window carrier detect samples are stored in register 62. The contents of shift register 62 are summed at 63 and coupled over link 67 as an input to a lookup table 65, the output of which is coupled over link 66 to one input of comparator 64. The summation quantity $N_{cd}$ at the output of adder 63 represents the number of occurrences within the window (shift register length) of interest in which the sample of the control channel indicates the presence of carrier. In terms of the modem shown in FIG. 3, this means that the carrier detect signal on link 31 is sampled periodically by microcontroller 23 and processed in the manner shown by the functional illustration of the units of the access test 507 in FIG. 13.

The value $N_{cd}$ may vary from zero up to the total number of stages in the shift register (or the length of the window) and is a measure of channel utilization. The current value of the quantity $N_{cd}$, being a direct indication of recent channel utilization, is used to directly influence the probability of accepting new packets on the control channel.

Before a new packet can be allowed entry onto the control channel, it must pass a threshold test carried out by comparator 64. As will be appreciated from the description to follow, this test becomes successively harder to pass as the channel becomes busier.

Figure 14:
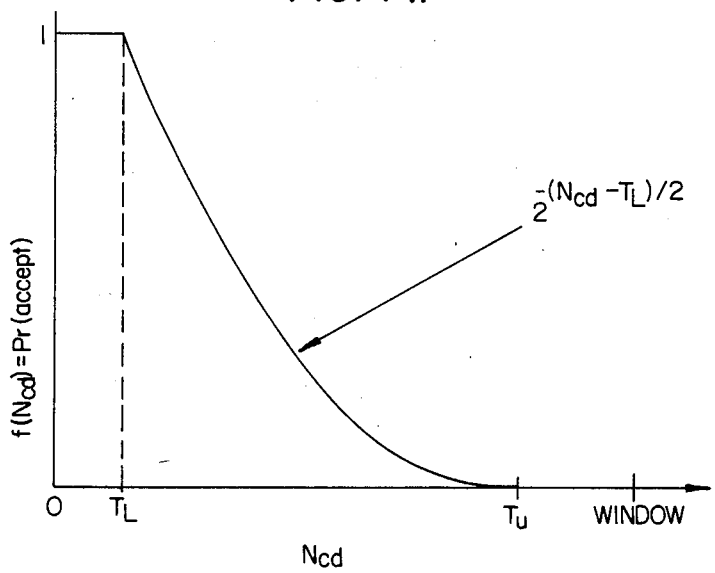
FIG. 14 is a graph showing the probability function used for the channel access scheme of FIG. 13.

The test is illustrated by the probability function $f(N_{cd})$ shown in FIG. 14. Typical values of the lower and upper threshold $T_L$ and $T_u$ are 0 and 25, respectively. It should be realized, of course, that these values are only exemplary and not limitative of the application of the invention. Based upon the most recently measured value of $N_{cd}$, a new message packet will have a probability of entry onto the control channel $f(N_{cd})$. The probability function $f(N_{cd})$ shown in FIG. 14 is defined by the expression $f(N_{cd})=2^{-(N_{cd}-TL)/2}$ for $N_{cd} \leq 25$, and $F(N_{cd})=0$ $N_{cd}>25$.

As shown in FIG. 13, the values $N_{cd}$ from adder 63 are applied to a lookup table 65 which contains the probability function $f(N_{cd})$. The output of lookup table 65 is a reference threshold which is coupled over link 66 to the other input of comparator 64 and represents the probability $f(N_{cd})$. A second input to the comparator 64 is the output of a random number generator 69. As long as the output of the random number generator is less than the threshold established by the lookup table 65, comparator 64 will provide a "pass" output, indicating that the modem has access to the channel. If the number is greater than the threshold, the output of the comparator 64 indicates a failure of the test and the modem must delay some random delay upon a specific number of packet times before again making the access test. This is illustrated in FIG. 13 by random delay 507A which supplies an enable to the comparator function 64. Until the random delay is terminated, the comparator 64 is not enabled so that no pass/fail test can be conducted. Once the test is passed, a request packet is coupled to the control channel. It should be noted that even though the above-described access contention test is passed, a collision on the control channel can still occur; the purpose of the test is to reduce the probability of a collision. Should a collision occur, the transmitting modem will become aware of this anomoly as it will not receive an acknowledgement back from the receiver modem, thereby causing the transmitter modem to retune itself to the control channel and repeat the process again.

A particular advantageous feature of the access test described above is its ability to provide optimal use of the channel, rather than wait for collisions to occur and then gradually backoff the access to requests for service such as are carried out in the Aloha and Ethernet approaches.

As will be appreciated from the foregoing description of the communication network according to the present invention, because the transceiver equipment (modem) associated with each attached device is frequency agile, it is adaptable for use with both control messages and data messages on separate communication channels. As a result, there is no need for a separate facility dedicated for carrying out control functions through which calls between devices are established. Moreover, through the use of a communication channel access contention access scheme that optimizes throughput regardless of user demand for the channel, incorporation of a separate arbitration/priority resolution mechanism that is user sensitive, rather than system performance oriented as in the invention, is avoided. There is thus established a local user network that has reduced system complexity, as contrasted with conventional approaches enumerated previously, and also enjoys significantly reduced traffic congestion problems.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use in a communication network wherein a plurality of stations may communicate with one another over a prescribed transmission medium through the use of transceiver equipment thereat, a method of establishing a communication link between first and second stations, so that said first and second stations may convey messages therebetween over said communication link comprising the steps of:
   (a) establishing a spectrum of carrier frequencies within which are defined a control carrier frequency to be modulated with control information to be exchanged among stations of the network and a plurality of data carrier frequencies to be modulated with data to be exchanged among stations of the network;
   (b) at said first station, controllably tuning the transceiver equipment thereat to locate a pair of data carrier frequencies that are available for use for conveying data messages thereover;
   (c) at said first station, tuning the transceiver equipment thereat to said control carrier frequency and transmitting a control message over said control frequency to said second station identifying said located pair of data carrier frequencies; and
   (d) at said first and second stations, tuning the transceiver equipment thereat to said pair of data carrier frequencies so as to effectively establish said communication link between said first and second stations so that messages may be conveyed therebetween by the modulation of said pair of data carrier frequencies with signals representative of data to be exchanged, and wherein step (c) includes, at said first station,
   (c1) tuning the transceiver equipment thereat to said control carrier frequency and examining the utilization of said control carrier frequency, and
   (c2) upon detecting the utilization of said control carrier frequency to be representative of a prescribed probability of success in conveying a control message thereover to said second station, proceeding to transmit said control message.

2. A method according to claim 1, wherein step (c2) includes the step of, upon detecting the utilization of said control carrier frequency to be greater than that representative of a prescribed probability of success in conveying a control message thereon to said second station, delaying the transmission of said control message until a subsequent reexamination of the utilization of said control carrier frequency indicates that its utilization is representative of at least said prescribed probability of success in conveying a control message thereover to said second station.

3. For use in a communication network wherein a plurality of stations may communicate with one another over a prescribed transmission medium through the use of transceiver equipment thereat, a method of establishing a communication link between first and second stations, so that said first and second stations may convey messages therebetween over said communication link comprising the steps of:
   (a) establishing a spectrum of carrier frequencies within which are defined a control carrier frequency to be modulated with control information to be exchanged among stations of the network and a plurality of data carrier frequencies to be modulated with data to be exchanged among stations of the network;
   (b) at said first station, controllably tuning the transceiver equipment thereat to locate a pair of data carrier frequencies that are available for use for conveying data messages thereover;
   (c) at said first station, tuning the transceiver equipment thereat to said control carrier frequency and transmitting a control message over said control frequency to said second station identifying said located pair of data carrier frequencies; and
   (d) at said first and second stations, tuning the transceiver equipment thereat to said pair of data carrier frequencies so as to effectively establish said communication link between said first and second stations so that messages may be conveyed therebetween by the modulation of said pair of data carrier frequencies with signals representative of data to be exchanged, and wherein step (c) includes, at said first station, (c1) tuning the transceiver equipment thereat to said control carrier frequency and examining the utilization of said control carrier frequency, and (c2) upon detecting the utilization of said control carrier frequency to be representative of a prescribed probability of success in conveying a control message thereover to said second station, proceeding to transmit said control message and wherein step (c) includes, at said first station, (c1) tuning the transceiver equipment thereat to said control carrier frequency and examinating the utilization of said control carrier frequency, and (c2) inhibiting the transmission of a control message on said control carrier frequency as long as the utilization of said control carrier frequency is greater than that representative of a prescribed probability of success in conveying a control message thereover to said second station.

4. A method according to claim 3, wherein step (c1) includes the steps of:

(c1-1) successively sampling the output of said transceiver equipment as tuned to said control carrier frequency for the presence of said control carrier frequency and deriving therefrom a measure of the utilization of said control carrier frequency over a prescribed interval of time; and (c1-2) determining the probability of success in conveying a control message to said second station over said control carrier frequency in accordance with a prescribed probability characteristic defined in accordance with said measure of the utilization of said control carrier frequency.

5. A method according to claim 4, wherein step (c2) includes the steps of:

(c2-1) comparing the probability of success determined in step (c1-2) with a random quantity; and (c2-2) upon the probability of success determined in step (c1-2) defining a prescribed relationship with respect to said random quantity, proceeding to transmit said control message over said control carrier frequency.

6. A method according to claim 4, wherein step (c2) includes the steps of:

(c2-1) comparing the probability of success determined in step (c1-2) with a random quantity; and (c2-2) inhibiting the transmission of a control message on said control carrier frequency until the probability of success determined in step (c1-2) defines a prescribed relationship with respect to said random quantity.

7. A method according to claim 5, wherein step (c2-2) includes the step of causing step (c2-1) to be delayed by a random period of time and thereafter proceeding to enable steps (c2-1) and (c2-2) to be carried out.

8. A method according to claim 1, wherein the transceiver equipment at a respective station comprises a modem capable of transmitting and receiving messages over each of said control and data carrier frequencies.

9. A method according to claim 8, wherein step (b) comprise the steps of:

(b1) successively tuning said frequency agile modem to respective ones of said data carrier frequencies and, upon failing to detect the presence of carrier when said modem is tuned to a respective data carrier frequency, identifying said respective data carrier frequency as being available for use for conveying messages thereover.

10. A method according to claim 1, further including the steps of:

(e) at said first station, transmitting a command message on a first data carrier frequency of said pair of data carrier frequencies to said second station and monitoring said prescribed transmission medium for the presence of an acknowledgment message on a second data carrier frequency from said second station; and (f) at said second station, monitoring said prescribed transmission medium for the presence of said command message from said first station and transmitting said second data carrier over said prescribed transmission medium and, in response to said command message from said first station, transmitting said acknowledgment message on said second data carrier frequency.

11. A method according to claim 1, further including the steps of:

(e) at said first station, monitoring said prescribed transmission medium for the presence of a first of said pair of data carrier frequencies and, upon detecting no presence of said first data carrier frequency, transmitting said first data carrier frequency over said transmission medium; and (f) at said second station, monitoring said prescribed transmission medium for the presence of a second of said pair of data carrier frequencies and, upon detecting no presence of said second data carrier frequency, transmitting said second data carrier frequency over said transmission medium.

12. A method according to claim 11, wherein step (e) includes the step of transmitting a prescribed command message to said second station over said first data carrier frequency and, in response to a prescribed response message from said second station over said second data carrier frequency, proceeding to modulate said first data carrier frequency with a first data information signal.

13. A method according to claim 12, wherein step (f) includes the step of transmitting a prescribed response message to said first station over said second data carrier frequency in reply to said prescribed command message and thereafter proceeding to modulate said second data carrier frequency with a second data information signal.

14. A method according to claim 1, further including the step of:

(e) at said first station, monitoring said prescribed transmission medium for the presence of a first of said pair of data carrier frequencies and, upon detecting the presence of said first data carrier frequency, repeating step (b) to locate a new pair of data carrier frequencies that are available for use for conveying data messages thereover and repeating steps (c) and (d) for said new pair of carrier frequencies.

15. A method according to claim 1, further including the step of:

(e) at said second station, monitoring said prescribed transmission medium for the presence of one of said pair of data carrier frequencies and, upon detecting no presence of said one data carrier frequency, transmitting said one data carrier frequency over said transmission medium, but otherwise, upon detecting the presence of said one data carrier frequency, inhibiting the transmission therefrom of said one data carrier frequency.

16. A method according to claim 15, further including the step of:
(f) at said first station, monitoring said prescribed transmission medium for the presence of the other of said pair of data carrier frequencies and, upon detecting no presence of said other data carrier frequency, transmitting said other data carrier frequency over said transmission medium.

17. A method according to claim 1, wherein said messages comprise digitally encoded message packets modulated onto said carrier frequencies in the form of binary phase shift keyed modulation.

18. For use in a communication network wherein a plurality of stations may communicate with one another over a prescribed communication link, a method of controlling access to said link by one station desiring to convey a message over said link to another station comprising the steps of:
(a) examining said link for the presence of communication utilization thereof; and
(b) upon detection communication utilization of said link to be representative of a prescribed probability of success in conveying a message over said link from one station to another station, proceeding to access said link and wherein step (b) includes the step of, upon detecting the communication utilization to be greater than that representative of a prescribed probability of success in conveying a message over said link from said one station to another station, delaying access to said communication link until a subsequent reexamination of the communication utilization indicates that the communication utilization is representative of at least said probability of success in conveying a message over said link from said one station to another station.

19. For use in a communication network wherein a plurality of stations may communicate with one another over a prescribed communication link, a method of controlling access to said link by one station desiring to convey a message over said link to another station comprising the steps of:
(a) examining said link for the presence of communication utilization thereof; and
(b) upon detection communication utilization of said link to be representative of a prescribed probability of success in conveying a message over said link from one station to another station, proceeding to access said link, and wherein step (a) comprises the steps of:
(a1) successively sampling said link for the presence of a communication utilization thereof and deriving therefrom a measure of the communication utilization of said link over a prescribed interval of time; and
(a2) determining the probability of success in conveying a message from said one station to said another station over said link in accordance with a prescribed probability characteristic defined in accordance with said measure of communication utilization on said link.

20. A method according to claim 19, wherein step (b) comprises the steps of:
(b1) comparing the probability of success determined in step (a2) with a random quantity; and
(b2) upon the probability of success determined in step (a2) defining a prescribed relationship with respect to said random quantity, proceeding to access said communication link.

21. A method according to claim 19, wherein step (b) includes the steps of:
(b1) comparing the probability of success determined in step (a2) with a random quantity; and
(b2) inhibiting of access to said communication link until the probability of success determined in step (a2) defines a prescribed relationship with respect to said random quantity.

22. A method according to claim 21, wherein step (b2) includes the step of causing step (b1) to be delayed by a random period of time and thereafter proceeding to enable steps (b1) and (b2) to be carried out.

23. A method according to claim 18, wherein step (a) comprises examining said communication link for the presence of carrier by modulation of which messages are conveyed among said stations.

24. For use in a communication network wherein a plurality of stations may communicate with one another over a prescribed signal transmission medium, a method of establishing a communication link between respective stations of said network so that said stations may convey messages therebetween comprising the steps of:
(a) establishing a control channel over which control information among stations of the network may be exchanged, and a plurality of data channels available for use by said stations for conveying data messages therebetween;
(b) providing at each station a transceiver capable of being tuned to said control channel and any of said data channels;
(c) tuning the transceivers of respective ones of stations between which data messages are to be exchanged to said control channel and exchanging control information thereover; and, thereafter,
(d) tuning the transceivers of said respective ones of stations to prescribed data channels so that data may be exchanged thereover between said respective stations, and wherein (c) includes the step of, at one of said stations, examining the utilization of said control channel and inhibiting access to said control channel by said one of said stations until the utilization of said control channel has been detected to be representative of a prescribed probability of success in conveying control information thereover to another of said stations.

25. A method according to claim 24, wherein step (d) includes:
at said one station, transmitting a first carrier frequency from a transmitter portion of the transceiver thereat, while tuning a receiver portion of the transceiver to a second carrier frequency; and
at said another station, transmitting said second carrier frequency from a transmitter portion of the transceiver thereat, while tuning a receiver portion of the transceiver to said first carrier frequency.

26. A method according to claim 25, further including the step of exchanging data messages between said one station and said another station by modulating said first and second carrier frequencies with encoded data signals.

27. For use in a communication network wherein a plurality of stations may communicate with one another over a prescribed signal transmission medium, a system of establishing a communication link between respective stations of said network so that said stations may convey messages therebetween, comprising:

at each station, a transceiver capable of being tuned to a control channel over which control information among stations of the network for assigning data channels may be exchanged and any of a plurality of data channels over which data messages are exchanged between stations of the network, and;

at respective ones of stations between which data messages are to be exchanged, means for tuning the transceivers thereat to said control channel and exchanging control information thereover and for tuning, thereafter, the transceivers of said respective ones of stations to prescribed data channels so that data may be exchanged thereover between said respective stations, and wherein each transceiver includes means for examining the utilization of said control channel and inhibiting access to said control channel by said one of said stations until the utilization of said control channel has been detected to be representative of a prescribed probability of success in conveying control information thereover to another of said stations.

28. A system according to claim 27, wherein the transceiver at a first said station includes means for transmitting a first carrier frequency from a transmitter portion of the transceiver thereat while tuning a receiver portion of the transceiver to a second carrier frequency, and at another station, the transceiver thereat includes means for transmitting said second carrier frequency from a transmitter portion of the transceiver thereat while tuning a receiver portion of the transceiver to said first carrier frequency.

29. A system according to claim 28, wherein each transceiver includes means for modulating said first and second carrier frequencies with encoded data signals.

30. For use in a communication network wherein a plurality of stations may communicate with one another via transceiver equipment thereat, a method of establishing a communication link between first and second stations so that messages may be conveyed between said first and second stations over said communication link comprising the steps of:
  (a) establishing a control channel over which control information among stations of the network may be exchanged, and a plurality of data channels available for use by said stations for conveying messages therebeteen;
  (b) at said first station, locating a data channel among said plurality that is available for use for conveying messages thereover;
  (c) at said first station, transmitting a control message over said control channel to said second station identifying said located data channel; and
  (d) at said first and second stations, tuning transceiver equipment thereat to said data channel so as to effectively establish said communication link between said first and second stations over said located data channel, and wherein step (c) includes, at said first station,
  (c1) tuning transceiver equipment thereat to said control channel and examining the utilization of said control channel, and
  (c2) upon detecting the utilization of said control channel to be representative of a prescribed probability of success in conveying a control message thereover to said second station, proceeding to transmit said control message, and wherein step (c2) includes the step of, upon detecting the utilization of said control channel to be greater than that representative of a prescribed probability of success in conveying a control message thereover to said second station, delaying the transmission of said control message until a subsequent reexamination of the utilization of said control channel indicates that its utilization is representative of at least said prescribed probability of success in conveying a control message thereover to said second station.

31. For use in a communication network wherein a plurality of stations may communicate with one another via transceiver equipment thereat, a method of establishing a communication link between first and second stations so that messages may be conveyed between said first and second stations over said communication link comprising the steps of:
  (a) establishing a control channel over which control information among stations of the network may be exchanged, and a plurality of data channels available for use by said stations for conveying messages therebeteen;
  (b) at said first station, locating a data channel among said plurality that is available for use for conveying messages thereover;
  (c) at said first station, transmitting a control message over said control channel to said second station identifying said located data channel; and
  (d) at said first and second stations, tuning transceiver equipment thereat to said data channel so as to effectively establish said communication link between said first and second stations over said located data channel, and wherein step (c) includes
  (c1) tuning transceiver equipment thereat to said control channel and examining the utilization of said control channel, and
  (c2) upon detecting the utilization of said control channel to be representative of a prescribed probability of success in conveying a control message thereover to said second station, proceeding to transmit said control message, and wherein (c2) includes the step of, upon detecting the utilization of said control channel to be greater than that representative of a prescribed probability of success in conveying a control message thereover to said second station, delaying the transmission of said control message until a subsequent reexamination of the utilization of said control channel indicates that its utilization is representative of at least said prescribed probability of success in conveying a control message thereover to said second station, and wherein step (c) includes, at said first station,
  (c1) tuning transceiver equipment thereat to said control channel and examining the utilization of said control channel, and
  (c2) inhibiting the transmission of a control message on said control channel as long as the utilization of said control channel is greater than that representative of a prescribed probability of success in conveying a control message thereover to said second station.

32. For use in a communication network wherein a plurality of stations may communicate with one another via transceiver equipment thereat, a method of establishing a communication link between first and second stations so that messages may be conveyed between said first and second stations over said communication link comprising the steps of:
- (a) establishing a control channel over which control information among stations of the network may be exchanged, and a plurality of data channels available for use by said stations for conveying messages therebeteen;
- (b) at said first station, locating a data channel among said plurality that is available for use for conveying messages thereover;
- (c) at said first station, transmitting a control message over said control channel to said second station identifying said located data channel; and
- (d) at said first and second stations, tuning transceiver equipment thereat to said data channel so as to effectively establish said communication link between said first and second stations over said located data channel, and wherein step (c) includes
  - (c1) tuning transceiver equipment thereat to said control channel and examining the utilization of said control channel, and
  - (c2) upon detecting the utilization of said control channel to be representative of a prescribed probability of success in conveying a control message thereover to said second station, proceeding to transmit said control message, and wherein (c2) includes the step of, upon detecting the utilization of said control channel to be greater than that representative of a prescribed probability of success in conveying a control message thereover to said second station, delaying the transmission of said control message until a subsequent reexamination of the utilization of said control channel indicates that its utilization is representative of at least said prescribed probability of success in conveying a control message thereover to said second station,
  - (c1) tuning transceiver equipment thereat to said control channel and examining the utilization of said control channel, and
  - (c2) upon detecting the utilization of said control channel to be representative of a prescribed probability of success in conveying a control message thereover to said second station, proceeding to transmit said control message, and wherein step (c1) includes the steps of:
    - (c1-1) successively sampling the output of said transceiver equipment as tuned to said control channel for the presence of a control carrier frequency and deriving therefrom a measure of the utilization of said control channel over a prescribed interval of time; and
    - (c1-2) determining the probability of success in conveying a control message to said second station over said control channel in accordance with a prescribed probability characteristic defined in accordance with said measure of utilization of said control channel.

33. A method according to claim 32, wherein step (c2) includes the steps of:
- (c2-1) comparing the probability of success determined in step (c1-2) with a random quantity; and
- (c2-2) upon the probability of success determined in step (c1-2) defining a prescribed relationship with respect to said random quantity, proceeding to transmit said control message over said control channel.

34. A method according to claim 32, wherein step (c2) includes the steps of:
- (c2-1) comparing the probability of success determined in step (c1-2) with a random quantity; and
- (c2-2) inhibiting the transmission of a control message on said control channel until the probability of success determined in step (c1-2) defines a prescribed relationship with respect to said random quantity.

35. A method according to claim 33, wherein step (c2-2) includes the step of causing step (c2-1) to be delayed by a random period of time and thereafter proceeding to enable steps (c2-1) and (c2-2) to be carried out.

36. A method according to claim 30, wherein the transceiver equipment at a respective station comprises a modem capable of transmitting and receiving messages over each of said control and data channels.

* * * * *